Figure 1:
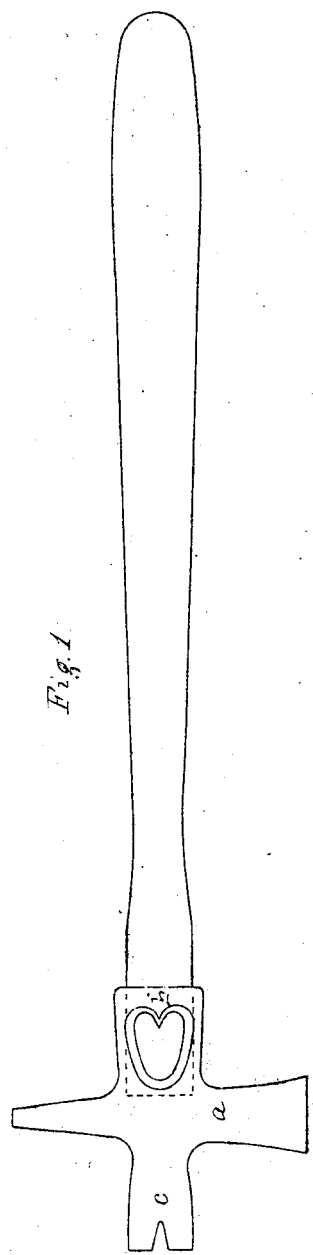

T. Evans.
Tack-Hammer.

№ 71290      Patented Nov. 26, 1867.

Witnesses
Francis A. Evans
Thos. S. Crane

Inventor
Thos. Evans

United States Patent Office.

THOMAS EVANS, OF NEWARK, NEW JERSEY.

Letters Patent No. 71,290, dated November 26, 1867.

IMPROVED TACK-HAMMER.

*The Schedule referred to in these Letters Patent and making part of the same.*

---

Be it known that I, THOMAS EVANS, of Newark, Essex county, New Jersey, have invented a new and useful Tack-Hammer; and I do hereby declare that the following is a full and exact description thereof, reference being had to the accompanying drawings, and to the letters marked thereon.

My invention consists in casting or forging a tack-hammer head, having a claw in line with and opposite to the handle, with a socket for the insertion of said handle, which is formed with openings on one or both sides, as shown in the drawings, and provided with spurs to be embedded into the side of the handle after it has been driven into said socket, and thus hold it securely in place.

To enable others to make and use my invention, I will refer to the drawings, in which—

Figure 1 is a side view of the hammer complete.

Figure 2:
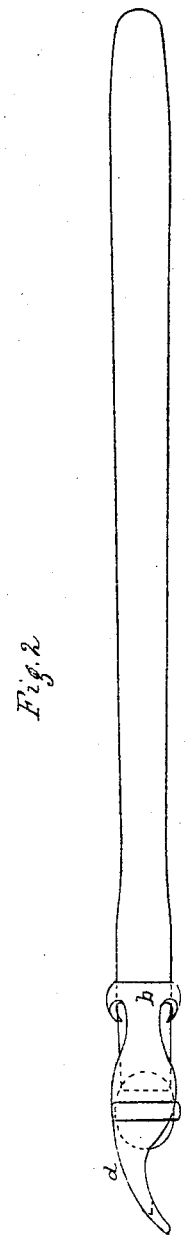

Figure 2, an edge view of the same.

$a$ is the hammer-head. $b$, the socket for the handle, made with openings in the side, shaped with spurs extending from the handle side of said openings towards their centre, which, after the handle is driven into the socket, are to be embedded into its sides. $c$, the claw, (cast or forged on the head opposite to the handle—shaped convexly where it is applied to the surface, in which a tack may be fastened. $d$ is the convexity above named.

What I therefore claim, is—

A hammer-head constructed with a socket, $b$, having openings in its sides, with spur projections therein for securing the handle when driven into said socket, substantially as shown and described.

THOS. EVANS.

Witnesses:
T. S. CRANE,
FRANCIS A. EVANS.